United States Patent [19]

Tsunogae et al.

[11] Patent Number: 5,539,060
[45] Date of Patent: Jul. 23, 1996

[54] METHOD FOR HYDROGENATION OF METATHESIS POLYMERS

[75] Inventors: Yasuo Tsunogae; Hideharu Mizuno; Teiji Kohara, all of Kawasaki; Tadao Natsuume, Yokosuka, all of Japan

[73] Assignee: Nippon Zeon Co., Ltd., Tokyo, Japan

[21] Appl. No.: 542,654

[22] Filed: Oct. 13, 1995

Related U.S. Application Data

[63] Continuation of Ser. No. 282,596, Jul. 29, 1994, abandoned.

[30] Foreign Application Priority Data

Jul. 30, 1993 [JP] Japan .................................. 5-208509
Sep. 30, 1993 [JP] Japan .................................. 5-269619

[51] Int. Cl.$^6$ .................................................. C08F 8/04
[52] U.S. Cl. .................. 525/338; 525/328.1; 525/332.8; 525/332.9; 525/333.1; 525/333.2; 525/331.7; 525/326.1
[58] Field of Search ........................................ 525/338, 339

[56] References Cited

U.S. PATENT DOCUMENTS 5,106,920  4/1992  Murakami et al. .................. 525/326.1
5,164,469  11/1992  Goto et al. ............................. 525/338

*Primary Examiner*—Bernard Lipman
*Attorney, Agent, or Firm*—Armstrong, Westerman, Hattori, McLeland & Naughton

[57] ABSTRACT

The present invention provides a method for hydrogenating a metathesis polymer solution obtained by polymerization in the presence of a metathesis polymerization catalyst comprising (a) the catalyst component of a transition metal compound and (b) the co-catalyst component of a metal compound by bringing the above solution into contact with hydrogen, without adding an inactivating agent for the metathesis polymerization catalyst, that is, with the solution left to contain the catalyst, in the presence of a hydrogenation catalyst comprising a transition metal compound (c) and a reductive metal compound (d) and if necessary by adding an acid-binding compound. According to this method, both addition of the inactivating agent and removal of the metathesis polymerization catalyst are not necessary, and also the hydrogenation can be carried out at a lower temperature and under a lower pressure than in hydrogenation with a supported-type catalyst, so that the efficiency of production of the hydrogenated product is excellent. Besides, even if tungsten hexachloride ($WCl_6$), etc. are used as the catalyst component, an effect of preventing a hydrogenation reactor from corrosion by a hydrogen halide, can be obtained.

19 Claims, No Drawings

METHOD FOR HYDROGENATION OF METATHESIS POLYMERS

This application is a continuation of application Ser. No. 08/282,596 filed Jul. 29, 1994, now abandoned.

FIELD OF THE INVENTION AND RELATED ART STATEMENT

1. Field of the Invention

The present invention relates to a method for hydrogenation of metathesis polymers. More particularly, it relates to a method for hydrogenation of metathesis polymers in which the unsaturated bonds in the main chain of the polymers are saturated with a good efficiency and under mild conditions.

2. Related Art

The metathesis polymer is widely produced in industry. Since, however, it contains unsaturated bonds in the structure of the main chain, there are problems in terms of weather resistance, oxidation resistance, heat resistance and the like. In order to dissolve these problems, it is widely carried out to saturate the structure of the main chain by hydrogenation of the polymer.

In the hydrogenation step after metathesis polymerization of the monomer, in order to prevent the hydrogenation catalyst from activity reduction caused by impurities, it is a common practice to extract and remove the metathesis polymerization catalyst by adding an inactivating agent for this catalyst to the solution in which the hydrogenation is to be carried out (Japanese Patent Application Kokai No. 1-311120). However, it is also known a method of obtaining the hydrogenated product of the metathesis polymer by directly adding the hydrogenation catalyst without removing the metathesis polymerization catalyst from the metathesis polymerization solution and then contacting the solution with hydrogen (as disclosed, for example, in Japanese Patent Application Kokai No. 1-138257, No. 1-311120, No. 2-286712, No. 4-93321, etc.). Of such the hydrogenation methods, only one specific example in which a highly active supported-type catalyst is used as the hydrogenation catalyst, is known (Japanese Patent Application Kokai No. 2-286712).

The supported-type hydrogenation catalyst is superior in production efficiency in that it is so highly active that hydrogenation is attained in a short time, and also that this catalyst is easily removable. This catalyst is therefore widely used. However, both high temperature and high pressure are necessary to carry out this hydrogenation. And besides, since this catalyst is a lump in which the catalyst component has been supported on the carrier, its sufficient dispersion in the polymer solution is difficult, and therefore this catalyst needs to be added in large amounts. Because of this, there is a problem of costing too much in industrial production. Further, both high temperature and high pressure are necessary, so that decomposition and gelation of the polymer are easy to occur, which sometimes causes a problem of the quality of polymer.

For removing the metathesis polymerization catalyst, there are a method of removing the catalyst by washing the polymerization solution with a solution containing an inactivating agent for this catalyst, and a method of removing the catalyst by changing the catalyst into a solid catalyst residue and then removing this residue by filtration or centrifugation. In these methods, however, it is difficult to completely remove the catalyst residue, and it often occurs that the catalyst residue enters the hydrogenation step. In such a case, it is sometimes observed that the catalyst residue hydrolyzes at the hydrogenation step to generate a hydrogen halide, which corrodes the reaction vessel.

Also, in the method in which the polymerization solution is directly supplied to the hydrogenation step without removing the polymerization catalyst itself or its residue, the production process is simplified, so that there is an advantage of the production efficiency being excellent. However, the polymerization catalyst or its residue is contained in the production process, so that there is a problem that a hydrogen halide is generated in large amounts and the corrosion of the equipment is remarkable.

The catalyst used in the hydrogenation includes the foregoing supported-type catalyst and a catalyst in which a transition metal compound (c) and a reductive metal compound (d) have been combined with each other. The latter catalyst is easily dispersible in the polymer solution, so that addition of small amounts of it will suffice, and also both high temperature and high pressure are not necessary. This catalyst, therefore, is superior to the supported-type catalyst in that the cost is low and the quality of the polymer is stable. The activity of this catalyst varies with combination of the transition metal compound (c) and reductive metal compound (d). In hydrogenation of the metathesis polymer, however, the highly active supported-type catalyst is present, so that the combination giving a high activity is not sufficiently investigated about the combined catalyst. The known combined catalyst is normally low in the activity as compared with the supported-type catalyst, and has problems that it takes much time to complete the hydrogenation, and the effects of impurities on hindrance to the reaction and reduction of the activity are large. Because of this, even if a method itself is known, as described above, in which hydrogenation is carried out without isolating the polymer from the metathesis polymerization solution, nothing concrete is known about a method of using the catalyst in which the transition metal compound (c) and reductive metal compound (d) have been combined with each other. Therefore, it has been considered that the metathesis polymer cannot be hydrogenated with a good efficiency in the presence of the metathesis polymerization catalyst whether the catalyst has been inactivated or not.

SUMMARY OF THE INVENTION

The present inventors have made an extensive study on a method for hydrogenating the metathesis polymer with excellent production efficiency, and as a result have found that even if the metathesis polymer contains the non-inactivated metathesis polymerization catalyst comprising (a) the catalyst component of a transition metal compound and (b) the co-catalyst component of a metal compound, the metathesis polymer can be hydrogenated with a good efficiency using the combined catalyst of the transition metal compound (c) with the reductive metal compound (d), particularly, using the combined catalyst having high activity, and on the other hand, that the activity of the combined catalyst of the transition metal compound (c) with the reductive metal compound (d) reduces when the inactivating agent for the metathesis polymerization catalyst is added. The present inventors thus completed the present invention.

Further, the present inventors have made an extensive study with the object of developing a method for hydrogenating the ring-opened polymer of a cyclo-olefin monomer which generates no hydrogen halide even if the halogen compound of the transition metal is used in the metathesis polymerization catalyst. As a result, they have found that generation of a hydrogen halide can be inhibited by allowing an acid-binding compound to exist at the time of hydrogenation. The present inventors thus completed the present invention.

DETAILED DESCRIPTION OF THE INVENTION

According to the present invention, there is provided a method for hydrogenation of a metathesis polymer characterized in that a metathesis polymer solution obtained by polymerization in the presence of a metathesis polymerization catalyst comprising (a) the catalyst component of a transition metal compound and (b) the co-catalyst component of a metal compound is brought into contact with hydrogen in the presence of a hydrogenation catalyst comprising a transition metal compound (c) and a reductive metal compound (d) without substantially inactivating the metathesis polymerization catalyst.

Further, according to the present invention, there is provided a method for producing the hydrogenated product of a cycloolefin ring-opened polymer by bringing a polymer solution, which is obtained by ring-opening polymerization of a cycloolefin monomer using a metathesis polymerization catalyst comprising the halide of a transition metal and an organometal compound, into contact with hydrogen in the presence of a hydrogenation catalyst, said method being characterized in that an acid-binding compound is allowed to exist in the hydrogenation system together with the hydrogenation catalyst.

Monomer:

In the present invention, the monomer used to produce the metathesis polymer includes, for example, monocyclic cycloolefins such as cyclobutene, 1-methylcyclobutene, 3-methylcyclobutene, 3,4-diisopropenylcyclobutene, cyclopentene, 3-methylcyclopentene, 5,6-dihydrocyclopentadiene, cyclohexene, 4-ethylcyclohexene, cyclooctene, 1-methylcyclooctene, 5-methylcyclooctene, cyclooctatetraene, 1,5-cyclooctadiene, cyclododecene, etc.; polycyclic cycloolefins such as bicyclo[3.2.0]-heptene, bicyclo[4.2.0]octene, tetrahydroindene, norbornene, norbornadiene, etc.; acetylenes such as acetylene and substituted acetylenes (e.g. propyne, 1-butyne); and dienes having double bonds at the both ends such as 1,6-heptadiene, etc.

Specific examples of the cycloolefin monomer used in the present invention include, for example, the following:

1. The above norbornene, the alkyl-, alkylidene-or aromatic group-substituted derivatives of the norbornene and the halogen- or polar group-substituted products of these substituted or non-substituted norbornene monomers (the polar group includes ester, alkoxy, cyano, amide, imide, silyl, etc.). These compounds include, for example, 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5,6-diethoxycarbonyl-2-norbornene, 1,4-methano-1,4,4a,9a-tetrahydro-9H-fluorene, etc.

2. Monomers in which one or more cyclopentadienes have added to norbornene, and the same derivatives and substituted products as above obtained from the monomers. These compounds include, for example, 1,4:5,8-dimethano-1,4,4a,5,6,7,8,8a-octahydronaphthalene, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6,6-dimethyl-1,4:5,8-dimethano-1,4,4a,5,6,7,8,8a-octahydronaphthalene, 6-methyl-6-methoxycarbonyl-1,4:5,8-dimethano-1,4,4a,5,6,7,8,8a-octahydronaphthalene, 4,9:5,8-dimethano-2,3,3a,4,4a,5,8,8a,9,9a-decahydro-1H-benzoindene, etc.

3. Monomers having a polycyclic structure which are the multimer of cyclopentadiene, and the same derivatives and substituted products as above obtained from the monomers. These compounds include, for example, dicyclopentadiene, 2,3-dihydrodicyclopentadiene, 4,9:5,8-dimethano-3a,4,4a,5,8,8a,9,9a-octahydro-1H-benzoindene, etc.

4. Addition products of cyclopentadiene with tetrahydroindene, etc., and the same derivatives and substituted products as above obtained from the addition products. These compounds include, for example, 1,4-methano-1,4,4a,4b,5,8,8a,9a-octahydro-9H-fluorene, 5,8-methano-3a,4,4a,5,8,8a,9,9a-octahydro-1H-benzoindene, 1,4:5,8-dimethano-1,2,3,4,4a,4b,7,8,8a,9a-decahydro-9H-fluorene, 1,4-methano-1,4,4a,9a-tetrahydrofluorene, etc.

These monomers may be used alone or in combination of two or more of them.

For the purpose of regulation of the molecular weight, etc., acyclic olefins, preferably α-olefins (e.g. ethylene, propylene, 1-butene, isobutene, styrene, 1-hexene, 4-methylpentene, etc.) may be used as a comonomer in an amount, usually, up to 10 mole%.

Metathesis polymerization catalyst:

The metathesis polymerization catalyst used in the present invention is known, for example, as disclosed in Japanese Patent Application Kokoku No. 41-20111, Japanese Patent Application Kokai No. 46-14910, Japanese Patent Application Kokoku No. 57-17883 and No. 57-61044, and Japanese Patent Application Kokai No. 54-86600, No. 58-127728 and No. 1-240517. Usually, this catalyst consists substantially of (a) the catalyst component of a transition metal compound and (b) the co-catalyst component of a metal compound.

The catalyst component of a transition metal compound (a) used in the metathesis polymerization catalyst is the compound of transition metals belonging to Groups IVB, VB, VIB, VIIB or VIII of Deming's periodic table. This compound includes the halide, oxyhalide, alkoxyhalide, alkoxide, carboxylate, (oxy)acetylacetonate, carbonyl complex, acetonitrile complex, hydride complex of these transition metals, their derivatives, and complexes of these compounds or their derivatives with a complexing agent such as $P(C_6H_5)_5$, etc.

Specific examples include $TiCl_4$, $TiBr_4$, $VOCl_3$, $VOBr_3$, $WBr_4$, $WBr_6$, $WCl_2$, $WCl_4$, $WCl_5$, $WCl_6$, $WF_4$, $WI_2$, $WOBr_4$, $WOCl_4$, $WOF_4$, $MoBr_2$, $MoBr_3$, $MoBr_4$, $MoCl_4$, $MoCl_5$, $MoF_4$, $MoOCl_4$, $MoOF_4$, $WO_2$, $H_2WO_4$, $NaWO_4$, $K_2WO_4$, $(NH_4)_2WO_4$, $CaWO_4$, $CuWO_4$, $MgWO_4$, $(CO)_5WC$ $(OCH_3)(CH_3)$, $(CO)_5WC$ $(OC_2H_5)(CH_3)$, $(CO)_5WC(OC_2H_5)(C_4H_5)$, $(CO)_5MoC$ $(OC_2H_5)(CH_3)$, $(CO)_5Mo=C$ $(C_2 H_5)$, $(N(C_2H_5)_2)$, tridecylammonium molybdate, tridecylammonium tungstate, etc. Practically, the compound of W, Mo, Ti or V, particularly the halide, oxyhalide or alkoxyhalide of these metals is preferred in terms of polymerization activity.

The co-catalyst component of a metal compound (b) used in the metathesis polymerization catalyst is the compound of metals belonging to Groups, IA, IIA, IIB, IIIA or IVA of Deming's periodic table, which compound needs to have at least one metal element-carbon bond or metal element-hydrogen bond. Such the compound includes, for example, the organic compound of Al, Sn, Li, Na, Mg, Zn, Cd, B, etc. Specifically, there are given organoaluminum compounds such as trimethylaluminum, triethylaluminum, tri-n-propylaluminum, triisopropylaluminum, triisobutylaluminum, trihexylaluminum, trioctylaluminum, triphenylaluminum, tribenzylaluminum, diethylaluminum monochloride, di-n-propylaluminum monochloride, diisobutylaluminum monochloride, di-n-butylaluminum monochloride, diethylaluminum monobromide, diethylaluminum monoiodide, diethylaluminum monohydride, di-n-propylaluminum monohydride, diisobutylaluminum monohydride, methylaluminum sesquichloride, ethylaluminum sesquibromide, isobutylaluminum sesquibromide, ethylaluminum dichloride, ethylaluminum dibromide, propylaluminum dichloride, isobutylaluminum dichloride, ethylaluminum dibromide, ethylaluminum diiodide, etc.; organotin compounds such as tetramethyltin, diethyldimethyltin, tetraethyltin, dibutyldiethyltin, tetrabutyltin, tetraisocumyltin, tetraphenyltin, triethyltin fluoride, triethyltin chloride, triethyltin bromide, triethyltin iodide, diethyltin difluoride, diethyltin diiodide, ethyltin trifluoride, ethyltin trichloride, ethyltin tribromide, ethyltin triiodide, etc.; organolithium compounds such as n-butyllithium, etc.; organosodium compounds such as n-pentylsodium, etc.; organomagnesium compounds such as methylmagnesium iodide, ethylmagnesium bromide, methylmagnesium bromide, n-propylmagnesium chloride, tert-butylmagnesium chloride, allylmagnesium chloride, etc.; organozinc compounds such as diethylzinc, etc.; organocadmium compounds such as diethylcadmium, etc.; organoboron compounds such as trimethylboron, triethylboron, tri-n-butylboron, etc.; and the like.

The metathesis polymerization activity can be enhanced by adding a third component besides the components (a) and (b). Such the third component includes aliphatic tertiary amines, aromatic tertiary amines, molecule-form oxygen, alcohols, ethers, peroxides, carboxylic acids, acid anhydrides, acid chlorides, esters, ketones, nitrogen-containing compounds, sulfur-containing compounds, halogen-containing compounds, molecule-form iodine, other Lewis acids and the like. Of these compounds, aliphatic or aromatic tertiary amines are preferred. Specific examples of these amines include triethylamine, dimethylaniline, tri-n-butylamine, pyridine, α-picoline and the like. Also, when compounds having an OH group such as alcohols, etc. are added in amounts exceeding their stoichiometric amount, they function as an inactivating agent disturbing the metathesis polymerization activity. The alcohols, therefore, need to be added in amounts not exceeding their stoichiometric amount. The stoichiometric amount referred to herein means a mole number represented by a numerical value obtained by dividing the product of mole number of the component (a) and oxidation number of the transition metal contained in the component (a) by the number of OH groups per one molecule of the OH group-containing compound.

As to the relation between the amounts of these components, the ratio of amounts of the components (a) and (b) is 1:1 to 1:100, preferably 1:2 to 1:50 in terms of the molar ratio of the metal elements contained in the components, and that of amounts of the component (a) and third component is usually 1:0.005 to 1:10, preferably 1:0.05 to 1:3 in terms of the molar ratio of the both components. When the amount of the component (b) is too small relative to that of the component (a), a sufficient activity expectable from the amount of the component (a) can not be obtained. When the amount of the component (b) is too large, removal of the excess component (b) becomes difficult, which raises the cost. When the amount of the third component is too small relative to that of the component (a), the effect of addition of the third component is small, and when the amount of the third component is too large, removal of the excess third component becomes difficult, which raises the cost.

Metathesis polymerization:

In the present invention, metathesis polymerization can be carried out without a solvent, but it can be carried out even in an inert organic solvent. For example, polymerization of the norbornene monomer is generally carried out in an inert organic solvent. Specific examples of such the solvent include aromatic hydrocarbons such as benzene, toluene, xylene, etc.; alicyclic hydrocarbons such as cyclohexane, etc.; halogenated hydrocarbons such as methylene dichloride, dichloroethane, dichloroethylene, tetrachloroethane, chlorobenzene, dichlorobenzene, trichlorobenzene, etc.; ethers such as diethyl ether, etc.; and the like. These solvents may be used in mixture of two or more of them. The amount of the solvent is in the range of usually 1 to 100 times, preferably 2 to 20 times in terms of a weight ratio to the amount of the monomer. When the amount of the solvent is too small, the viscosity of the polymerization solution becomes high with the progress of the polymerization, so that it is difficult to obtain a polymer having a high polymerization degree. When the amount of the solvent is too large, the catalyst and monomer become difficult to contact with each other, so that the reaction rate becomes slow and efficiency becomes bad.

The amount of the metathesis polymerization catalyst is in the range of usually 0.000001 to 1 time, preferably 0.0001 to 0.5 time in terms of the molar ratio of amount of the component (a) contained in the catalyst to amount of the monomer. Whether the amount of the component (a) is too small or too large, the monomer and catalyst become difficult to contact with each other, so that the reaction rate becomes slow and efficiency becomes bad.

The molecular weight of the resulting metathesis polymer can be regulated by adding to the reaction solution a compound having at least C—C double bond or C—C triple bond in the molecule or a polar allyl compound. The former compound includes α-olefins, α,ω-diolefins, acetylenes, etc., and the latter compound includes allyl chloride, allyl acetate, trimethylallyloxysilane, etc.

The temperature condition for metathesis polymerization is not critical, but it is usually −20° C. to 100° C., preferably 10° to 50° C., more preferably 20° C. to 50° C. When the temperature is too low, the reaction rate lowers, and when it is too high, the reaction becomes difficult to control and energy cost becomes high.

The metathesis polymerization is carried out under a pressure of usually 0.1 to 50 kgf/cm$^2$, preferably 0.5 to 10 kgf/cm$^2$, more preferably 1 to 5 kgf/cm$^2$.

Metathesis polymer:

The metathesis polymer used in the present invention may be any of a homopolymer and copolymer, so far as it is a polymer produced with the metathesis polymerization catalyst. And the copolymer may be any of a random copolymer, block copolymer and graft copolymer. Also, the metathesis polymer used in the present invention needs to have a weight average molecular weight of usually 1,000 to 1,000,000, preferably 5,000 to 200,000 as measured by GPC. Metathesis polymer solution containing metathesis polymerization catalyst:

In the present invention, the metathesis polymer solution obtained by polymerization in the presence of the metathesis polymerization catalyst is hydrogenated by contacting it with hydrogen in the presence of the hydrogenation catalyst without inactivating the metathesis polymerization catalyst before hydrogenation. Therefore, the inactivation step can be omitted and production efficiency is good. When the metathesis polymer solution is supplied to the hydrogenation step after a large amount of the inactivating agent (e.g. a compound having an OH group such as water, alcohols, etc.) is added according to the conventional method, the activity of the hydrogenation catalyst largely lowers. Even if the metathesis polymer is once isolated by coagulation, re-dissolved in the solvent and then supplied to the hydrogenation step, the activity of the hydrogenation catalyst is insufficient. However, if the metathesis polymerization catalyst is not substantially inactivated and therefore the unreacted inactivating agent is not present in the system, the activity of the hydrogenation catalyst is sufficient.

The concentration of this polymer solution is preferably 1 to 50 wt. %, more preferably 5 to 30 wt. %. When the concentration is too high, it may be diluted to a desirable one by adding additional inert organic solvent.

Hydrogenation catalyst:

The hydrogenation catalyst used in the present invention comprises a transition metal compound (c) and reductive metal compound (d). This catalyst is known, for example, as disclosed in Japanese Patent Application Kokai No. 58-43412, No. 60-26024, No. 64-24826 and No. 1-138257.

In the present invention, the transition metal compound (c) used in the hydrogenation catalyst is the compound of transition metals belonging to either of Groups I or IV to VIII of Deming's periodic table. Specifically, there are given, for example, the compound of transition metals such as V, Ti, Cr, Mo, Zr, Fe, Mn, Co, Ni, Pd, Ru, etc., and the compound includes halides, alkoxides, acetylacetonates, sulfonates, carboxylates, naphthenates, trifluoroacetates and stearates of these metals. Specific examples of the compound include tetraisopropoxy titanate, tetrabutoxy titanate, titanocene dichloride, zirconocene dichloride, vanadocene dichloride, triethyl vanadate, tributyl vanadate, chromium(III) acetylacetonate, molybdenyl acetylacetonate, manganese(III) acetylacetonate, iron(III) acetylacetonate, cobalt(III) acetylacetonate, bis(triphenylphosphine)cobalt dichloride, nickel(II) acetylacetonate, bis(tributylphosphine)nickel dichloride, bis(tributylphosphine)palladium dichloride, bis(cyclopentadienyl)titanium dichloride and the like.

In the present invention, the reductive metal compound (d) used in the hydrogenation catalyst is specifically the compound of metals belonging to Groups IA, IIA, IIB, IIIA or IVA of Deming's periodic table, which compound needs to have at least one metal atom-carbon bond or metal atom-hydrogen bond. Specifically, there are given aluminum compounds such as trimethylaluminum, triethylaluminum, triisobutylaluminum, triphenylaluminum, diethylaluminum chloride, ethylaluminum dichloride, methylaluminum sesquichloride, ethylaluminum sesquichloride, diethylaluminum hydride, diisobutylaluminum hydride, etc.; lithium compounds such as methyllithium, ethyllithium, n-propyllithium, n-butyllithium, sec-butyllithium, isobutyllithium, n-hexyllithium, phenyllithium, p-tolyllithium, xylyllithium, etc.; zinc compounds such as diethylzinc, bis(cyclopentadienyl)zinc, diphenylzinc, etc.; magnesium compounds such as dimethylmagnesium, diethylmagnesium, methylmagnesium bromide, methylmagnesium chloride, ethylmagnesium bromide, ethylmagnesium chloride, phenylmagnesium bromide, phenylmagnesium chloride, etc.; and the like. Compounds containing two or more kinds of reductive metal such as lithiumaluminum hydride, etc. can also be used.

One of specific combined catalysts is those in which the component (c) which is the organometal compound, halide, alkoxide, acetylacetonate, sulfonate or naphthenate of V, Ti, Mn, Fe, Co or Ni, and the component (d) which is the organic compound or hydride of Al, Li, Zn or Mg have been combined with each other. These catalysts are preferred because they have high activity and undergo only a little effect of impurities on hindrance to the reaction and reduction of the activity. And, the other of specific combined catalysts is those in which the component (c) which is the organometal compound, halide, alkoxide or acetylacetonate of Ti, Fe, Co or Ni, and the component (d) which is alkylaluminum or alkyllithium have been combined with each other. These catalysts are more preferred because they have particularly a high activity and undergo only particularly a little effect of impurities on hindrance to the reaction and reduction of the activity.

As to the relation between the amounts of these components, the amounts of the components (c) and (d) is 1:0.5 to 1:50, preferably 1:1 to 1:8 in terms of the molar ratio of metal atoms contained in the components. Whether the amount of the component (d) is too large or too small relative to that of the component (c), the hydrogenation activity becomes insufficient. Particularly, when the amount is too large, gelation and side reaction sometimes occur.

The unsaturated bond in the main chain structure of the polymer is hydrogenated by these hydrogenation catalysts to turn saturated bond, but usually, unsaturated bonds other than those in the main chain structure are also hydrogenated and saturated. However, when the polymer contains an aromatic ring, unsaturated bonds in this ring can be left unsaturated without being hydrogenated, for example, by using a hydrogenation catalyst in which bis(cyclopentadienyl)titanium dichloride which is the component (c) and alkyllithium which is the component (d) have been combined with each other (Japanese Patent Application Kokoku No. 63-4841), a hydrogenation catalyst in which dialkyl-bis(cyclopentadienyl)titanium which is the component (c) and a reductive magnesium compound which is the component (d) have been combined with each other (Japanese Patent Application Kokai No. 61-28507), or a hydrogenation catalyst in which dialkyl-bis(cyclopentadienyl)titanium which is the component (c) and alkoxylithiumwhich is the component (d) have been combined with each other (Japanese Patent Application Kokai No. 1-275605).

Acid-binding compound:

When the catalyst component of a transition metal compound (a) constituting the metathesis polymerization catalyst is a transition metal halide such as $TiCl_4$, $WCl_6$, etc., or the transition metal compound (c) constituting the hydrogenation catalyst is a transition metal halide such as bis(tributylphosphine)nickel dichloride, etc., or the reductive metal compound (d) is a metal halide such as ethylaluminum dichloride, etc., it sometimes occurs that water is generated at the time of hydrogenation, these metal halides are hydrolyzed by this water to evolve a hydrogen halide and as a result the hydrogenation reactor is corroded.

In the present invention, it is desirable to inhibit corrosion of the hydrogenation reactor, etc. by reacting the hydrogen halide with an acid-binding compound.

The acid-binding compound is a compound reacting with a hydrogen halide, and its specific examples include epoxy compounds such as ethylene oxide, propylene oxide, butylene oxide, cyclohexene oxide, styrene oxide, methyl glycidyl ether, ethyl glycidyl ether, butyl glycidyl ether, phenyl glycidyl ether, ethylene glycol diglycidyl ether, epoxy resins, etc.; basic compounds such as calcium hydroxide, magnesium hydroxide, calcium oxide, magnesium oxide, etc.; powdery, granular or ribbon-formmetals such as magnesium, aluminum, zinc, iron, etc.; and the like. Of these acid-binding compounds, epoxy compounds are preferred in terms of their high preventing effect on corrosion of the hydrogenation reactor.

The time at which the acid-binding compound is added may be any time before and after addition of the hydrogenation catalyst, so far as it is a time after finish of the polymerization and before beginning of the hydrogenation.

When the acid-binding compound is used, its amount used is 0.5 equivalent or more, preferably 1 to 100 equivalents, more preferably 2 to 10 equivalents based on the stoichiometric amount of an acid generated by hydrolysis of the metathesis polymerization catalyst and hydrogenation catalyst, in other words, the mole amount of the halogen atom contained in the metathesis polymerization catalyst and hydrogenation catalyst. For example, when the metathesis polymerization catalyst comprising $WCl_6$ and triethylaluminum is used, a hydrogen halide is not generated from triethylaluminum, but hydrogen chloride can be generated in amounts up to a maximum of 6 moles based on 1 mole of $WCl_6$. When the acid-binding compound used is aluminum which turns trivalent metal ion, in order to inhibit corrosion of the hydrogenation reactor by a hydrogen halide generated from $WCl_6$, the amount of the acid-binding compound used is 1 mole (=6 moles +3×0.5), preferably 2 to 200 moles, more preferably 4 to 20 moles based on 1 mole of $WCl_6$. Similarly, the same proportion of the acid-binding compound as above is used to prevent the reaction reactor from corrosion by an acid generated by hydrolysis of the hydrogenation catalyst.

When hydrogenation is carried out using the so-called homogeneous catalyst in which the transition metal compound (c) and reductive metal compound (d) have been combined with each other, as in the present invention, the generated water reacts with the reductive metal compound (d), so that, usually, the hydrogenation reactor, etc. are not corroded at the time of hydrogenation. However, after the hydrogenation is finished, that is, after the reaction solution in the reactor is contacted with oxygen in air by the after-treatment of hydrogenation in which the hydrogenation is stopped and the hydrogen gas in the reactor is replaced by air, the reaction product of the reductive metal compound with water is oxidized into water again to generate a hydrogen halide. It is preferred, therefore, to add the acid-binding compound before finish of the hydrogenation, that is, before contact of the reaction solution with air.

Hydorgenation:

The amount of the hydrogenation catalyst added to the metathesis polymer solution containing the metathesis polymerization catalyst is usually 0,001 to 1000 mmoles, preferably 0.1 to 100 mmoles, in terms of the amount of the transition metal compound, based on 100 g of the polymer. Addition of excess catalyst costs high, and besides after-treatment such as catalyst removal after hydrogenation is difficult.

The hydrogenation is carried out by introducing hydrogen into the polymer solution, and for example, a method of sufficiently contacting the introduced hydrogen with the polymer while stirring the solution, is preferred. The hydrogen pressure used in the hydrogenation is usually 0.1 to 100 $kg/cm^2$, preferably 2 to 40 $kg/cm^2$. When the pressure is too low, the hydrogenation does not proceed, and when it is too high, the reaction becomes difficult to control, and also side reaction and gelation are caused.

In the present invention, the hydrogenation is carried out at usually 0° to 200° C., preferably 20° C. to 100° C. When the temperature is too low, the hydrogenation rate is slow, and when it is too high, decomposition and gelation of the polymer are easy to occur, and also energy cost becomes high.

The hydrogenation can be stopped by stopping supply of hydrogen. It may be stopped by adding a compound having an OH group (e.g. water, alcohols) to inactivate the hydrogenation catalyst.

Recovery and purification of hydrogenated product:

A method for recovering the hydrogenated product of the polymer from the hydrogenation solution is not critical. For example, it will suffice to coagulate the hydrogenated product of the polymer by adding a large amount of a poor solvent (e.g. an alcohol) to the hydrogenation solution.

Hydrogenated product:

In the hydrogenated product obtained by the method of the present invention, the unsaturated bond in the main chain structure of the polymer has been saturated. The hydrogenation rate varies with the kind and amount of the hydrogenation catalyst, hydrogenation temperature, hydrogen pressure and the like. A desirable hydrogenation rate varies with the object of hydrogenation. Generally, however, the rate of hydrogenation of the unsaturated bond in the main chain structure is preferably 50% or more, more preferably 90% or more, particularly preferably 99% or more. Generally, when the rate of hydrogenation of the unsaturated bond in the main chain structure is low, the heat resistance and light fastness become poor.

Unsaturated bonds other than those in the main chain structure also are generally hydrogenated at the same rate as in the main chain structure. However, unsaturated bonds in an aromatic ring, as described before, can be left unsaturated without being selectively hydrogenated by selecting the hydrogenation catalyst. The hydrogenation rate of the unsaturated bonds in the aromatic ring and that of other unsaturated bonds can be measured in distinction from each other by infrared absorption spectrum.

The hydrogenated product of the metathesis polymer obtained by the present invention is useful in a wide field as various kinds of molded article, including optical materials. For example, there are given optical materials (optical discs, optical lenses, prisms, light-diffusing plates, optical cards, optical fibers, optical mirrors, substrates for liquid crystal display elements, light-conducting plates, polarizing films, phase retarder films, etc.), medical materials (e.g., containers for liquid, powdery or solid medicines such as containers holding liquid medicines for injection, ampoules, vials, pre-filled syringes, bags for transfusion, sealed medicine bags, press through packages, containers for solid medicines, containers for eye lotions, etc.; food containers; sampling containers such as sampling test tubes for blood test, caps for medicine containers, blood-collecting tubes, test sample containers, etc., sterilizing apparatus for medical tools such as injectors, surgical knives, forceps, gauzes, contact lenses, etc.; experimental and analytical tools such as beakers, Petri dishes, flasks, test tubes, centrifugal tubes, etc.; optical parts for medical treatment such as plastic lenses for medical test, etc.; piping materials such as transfusion tubes for medical treatment, pipes, joints, valves, etc.; artificial organs and parts such as dental plates, artificial hearts, artificial dental roots, etc.; and the like); materials for treatment of electronic parts (e.g., containers for treatment and transportation such as tanks, trays, carriers, cases, etc.; protecting materials such as carrier tapes, separation films, etc.; pipings such pipes, tubes, valves, flowmeters, filters, pumps, etc.; liquid-holding containers such as sampling containers, bottles, ampoule bags, etc.; and the like); general insulating materials (e.g., covering materials for electric wires and cables, insulating materials for electronic instruments for public welfare and industry, meters, instruments such as copying machines, computers, printers, televisions, video-cameras etc.), etc.; circuit boards (e.g., hard printed circuit boards, flexible printed circuit boards, multilayer printed circuit boards, etc., particularly high-frequency circuit boards for satellite communication instruments required for high-frequency characteristics); materials for transparent and conductive films (e.g., liquid crystal substrates, optical memories, flat-surface heaters such as defrosters for cars and airplanes, etc.), sealing materials for electro-conductors (e.g., transistors, IC, LSI, LED, etc.) and parts therefor, sealing materials for electric and electronic parts (e.g., motors, condensers, switches, sensors, etc.), structural materials for parabola antennas, flat antennas and radar domes; and the like.

Working examples;

The present invention will be illustrated specifically with reference to the following referential examples, examples and comparative examples.

Referential Example 1

One hundred and fifty parts by weight of dicyclopentadiene was dissolved in 300 parts by weight of cyclohexane, and 1 part by weight of 1-hexene was added as a molecular weight-regulating agent. To this solution were added as the component (a) 30 parts by weight of a 0.8% cyclohexane solution of tungsten hexachloride, as the component (b) 4 parts by weight of a 10% cyclohexane solution of tetrabutyltin and as the third component 0.8 part by weight of dibutyl ether. Metathesis ring-opening polymerization was carried out at 70° C. for 1 hour with stirring to obtain a polymer solution. The polymerization conversion was 100%, and the weight average molecular weight of the polymer measured by GPC was 23,300.

Referential Example 2

The polymer solution was obtained in the same manner as in Referential Example 1 except that 105 parts by weight of dicyclopentadiene and 45 parts by weight of norbornene were used in place of 150 parts by weight of dicyclopentadiene. The polymerization conversion was 100%, and the weight average molecular weight of the polymer was 30,500.

Referential Example 3

The polymer solution was obtained in the same manner as in Referential Example 1 except that tetraphenyltin was used in place of tetrabutyltin. The polymerization conversion was 100%, and the weight average molecular weight of the polymer was 23,900.

Referential Example 4

The polymer solution was obtained in the same manner as in Referential Example 1 except that norbornene was used in place of dicyclopentadiene and tetramethyltin was used in place of tetrabutyltin. The polymerization conversion was 100%, and the weight average molecular weight of the polymer was 27,000.

Referential Example 5

One hundred parts by weight of tetrahydroindene was dissolved in 244 parts by weight of cyclohexane. To this solution were added as the component (a) 54 parts by weight of a 0.8% cyclohexane solution of tungsten hexachloride, as the component (b) 1.8 parts by weight of a 23% cyclohexane solution of ethylaluminum dichloride and as the third component 0.055 part by weight of ethyl alcohol. Metathesis polymerization was carried out at 25° C. for 1 hour with stirring to obtain a polymer solution. The polymerization conversion was 38%, and the weight average molecular weight of the polymer measured by GPC was 76,200.

Referential Example 6

One hundred parts by weight of 8-methyltetracyclododecene was dissolved in 250 parts by weight of cyclohexane, and 0.5 part by weight of 1-hexene was added as a molecular weight-regulating agent. To this solution were added as the component (a) 1.6 parts by weight of titanium tetrachloride, as the component (b) 11 parts by weight of a 15% cyclohexane solution of triethylaluminum and as the third component 3.4 parts by weight of triethylamine. Metathesis ring-opening polymerization was carried out at 40° C. for 1 hour with stirring to obtain a polymer solution. The polymerization conversion was 85%, and the weight average molecular weight of the polymer measured by GPC was 34,800.

Example 1

To a 2-liter autoclave equipped with a stirrer were added 100 g of the polymer solution obtained in Referential Example 1, 0.38 g of cobalt(III) acetylacetonate as the component (c) and 300 g of cyclohexane. After replacing the air in the autoclave by hydrogen, a solution of 0.84 g of triisobutylaluminum, the component (d), in 9.16 g of cyclohexane was added to the autoclave. Reaction was carried out at 80° C. for 1 hour under a hydrogen pressure of 10 kg/cm$^2$. At a point when thirty minutes elapsed after beginning of the reaction, it was observed that hydrogen absorption had been completed. The hydrogenation rate of the polymer was 98.9%.

Example 2

Reaction was carried out in the same manner as in Example 1 except that the polymer solution obtained in Referential Example 2 was used in place of the polymer solution obtained in Referential Example 1, and that a solution of 1.68 g of triisobutylaluminum, the component (d), in 8.32 g of cyclohexane was used. At a point when thirty minutes elapsed after beginning of the reaction, it was observed that hydrogen absorption had been completed. The hydrogenation rate of the polymer was 99.4%.

Example 3

Reaction was carried out in the same manner as in Example 1 except that 1.90 g of cobalt(III) acetylacetonate was used as the component (c), a solution of 4.20 g of triisobutylaluminum, the component (d), in 5.80 g of cyclohexane was used, and that the reaction temperature was 60° C. At a point when thirty minutes elapsed after beginning of the reaction, it was observed that hydrogen absorption had been completed. The hydrogenation rate of the polymer was 99.9%.

Example 4

Reaction was carried out in the same manner as in Example 1 except that the polymer solution obtained in Referential Example 6 was used in place of the polymer solution obtained in Referential Example 1, 1.90 g of cobalt(III) acetylacetonate was used as the component (c), a solution of 4.20 g of triisobutylaluminum, the component (d), in 5.80 g of cyclohexane was used, and that the reaction temperature was 60° C. At a point when thirty minutes elapsed after beginning of the reaction, it was observed that hydrogen absorption had been completed. The hydrogenation rate of the polymer was 99.9%.

Example 5

Reaction was carried out in the same manner as in Example 1 except that 0.14 g of nickel(II) acetylacetonate was used as the component (c), and a solution of 0.42 g of triisobutylaluminum, the component (d), in 9.58 g of cyclohexane was used. At a point when thirty minutes elapsed after beginning of the reaction, it was observed that hydrogen absorption had been completed. The hydrogenation rate of the polymer was 99.9%.

Example 6

Reaction was carried out in the same manner as in Example 1 except that the polymer solution obtained in Referential Example 2 was used in place of the polymer solution obtained in Referential Example 1, 0.14 g of nickel(II) acetylacetonate was used as the component (c), and that a solution of 0.42 g of triisobutylaluminum, the component (d), in 9.58 g of cyclohexane was used. At a point when thirty minutes elapsed after beginning of the reaction, it was observed that hydrogen absorption had been completed. The hydrogenation rate of the polymer was 99.9%.

Example 7

Reaction was carried out in the same manner as in Example 1 except that the polymer solution obtained in Referential Example 5 was used in place of the polymer solution obtained in Referential Example 1, 0.14 g of nickel(II) acetylacetonate was used as the component (c), and that a solution of 0.42 g of triisobutylaluminum, the component (d), in 9.58 g of cyclohexane was used. At a point when thirty minutes elapsed after beginning of the reaction, it was observed that hydrogen absorption had been completed. The hydrogenation rate of the polymer was 99.9%.

Example 8

Reaction was carried out in the same manner as in Example 1 except that the polymer solution obtained in Referential Example 4 was used in place of the polymer solution obtained in Referential Example 1, 0.14 g of nickel(II) acetylacetonate was used as the component (c), and that a solution of 0.42 g of triisobutylaluminum, the component (d), in 9.58 g of cyclohexane was used. At a point when thirty minutes elapsed after beginning of the reaction, it was observed that hydrogen absorption had been completed. The hydrogenation rate of the polymer was 99.9%.

Example 9

Reaction was carried out in the same manner as in Example 1 except that the polymer solution obtained in Referential Example 2 was used in place of the polymer solution obtained in Referential Example 1, 0.25 g of bis(cyclopentadienyl)titanium dichloride was used as the component (c), and that a solution of 0.26 g of n-butyllithium, the component (d), in 9.74 g of cyclohexane was used. At a point when thirty minutes elapsed after beginning of the reaction, it was observed that hydrogen absorption had been completed. The hydrogenation rate of the polymer was 91.5%.

Example 10

Reaction was carried out in the same manner as in Example 1 except that 0.25 g of bis(cyclopentadienyl)titanium dichloride was used as the component (c), a solution of 0.26 g of n-butyllithium, the component (d), in 9.74 g of cyclohexane was used, the reaction temperature was 60° C., and that the hydrogen pressure was 30 kgf/cm$^2$. At a point when thirty minutes elapsed after beginning of the reaction, it was observed that hydrogen absorption had been completed. The hydrogenation rate of the polymer was 97.3%.

Example 11

Reaction was carried out in the same manner as in Example 1 except that 1.00 g of bis(cyclopentadienyl)titanium dichloride was used as the component (c), a solution of 1.83 g of triethylaluminum, the component (d), in 8.17 g of cyclohexane was used, the reaction temperature was 60° C., and that the hydrogen pressure was 30 kgf/cm$^2$. At a point when thirty minutes elapsed after beginning of the reaction, it was observed that hydrogen absorption had been completed. The hydrogenation rate of the polymer was 93.8%.

Example 12

Reaction was carried out in the same manner as in Example 1 except that the polymer solution obtained in Referential Example 6 was used in place of the polymer solution obtained in Referential Example 1, 1.00 g of bis(cyclopentadienyl)titanium dichloride was used as the component (c), and that a solution of 1.02 g of n-butyllithium, the component (d), in 8.98 g of cyclohexane was used. At a point when thirty minutes elapsed after beginning of the reaction, it was observed that hydrogen absorption had been completed. The hydrogenation rate of the polymer was 91.7%.

Example 13

Reaction was carried out in the same manner as in Example 1 except that the polymer solution obtained in Referential Example 2 was used in place of the polymer solution obtained in Referential Example 1, 0.30 g of tetraisopropoxy titanate was used as the component (c), and that a solution of 0.85 g of triisobuytylaluminum, the component (d), in 9.15 g of cyclohexane was used. At a point when thirty minutes elapsed after beginning of the reaction, it was observed that hydrogen absorption had been completed. The hydrogenation rate of the polymer was 97.5%.

Example 14

Reaction was carried out in the same manner as in Example 1 except that the polymer solution obtained in Referential Example 3 was used in place of the polymer solution obtained in Referential Example 1, 1.51 g of tetraisopropoxy titanate was used as the component (c), and that a solution of 2.43 g of triethylaluminum, the component (d), in 7.57 g of cyclohexane was used. At a point when thirty minutes elapsed after beginning of the reaction, it was observed that hydrogen absorption had been completed. The hydrogenation rate of the polymer was 92.3%.

Example 15

Reaction was carried out in the same manner as in Example 1 except that the polymer solution obtained in Referential Example 2 was used in place of the polymer solution obtained in Referential Example 1, 1.51 g of tetraisopropoxy titanate was used as the component (c), and that a solution of 1.36 g of n-butyllithium, the component (d), in 8.64 g of cyclohexane was used. At a point when thirty minutes elapsed after beginning of the reaction, it was observed that hydrogen absorption had been completed. The hydrogenation rate of the polymer was 92.7%.

Example 16

Reaction was carried out in the same manner as in Example 1 except that 1.51 g of tetraisopropoxy titanate was used as the component (c), and that a solution of 2.12 g of triisobutylaluminum, the component (d), in 7.88 g of cyclohexane was used. At a point when thirty minutes elapsed after beginning of the reaction, it was observed that hydrogen absorption had been completed. The hydrogenation rate of the polymer was 95.4%.

Example 17

To a 2-liter autoclave equipped with a stirrer were added 100 g of the polymer solution obtained in Referential Example 1, 0.3 g of butyl glycidyl ether, 0.38 g of cobalt(III) acetylacetonate as the component (c) and 300 g of cyclohexane. After replacing the air in the autoclave by hydrogen, a solution of 0.84 g of triisobutylaluminum, the component (d), in 9.16 g of cyclohexane was added to the autoclave. Reaction was carried out at 80° C. for 1 hour under a hydrogen pressure of 10 kgf/cm$^2$. At a point when thirty minutes elapsed after beginning of the reaction, it was observed that hydrogen absorption had been completed. The hydrogenation rate of the polymer was 98.7%.

Using this autoclave, hydrogenation was repeated ten times in total under the same conditions. The inner surface of the autoclave was examined, but corrosion was not observed.

Comparative Example 1

Five hundred grams of the polymer solution obtained in Referential Example 1 was added dropwise to 20 liters of violently stirred isopropanol to coagulate and precipitate the polymer. The polymer was filtered off and sufficiently washed with isopropanol. By this treatment, the metathesis polymerization catalyst was inactivated and removed from the polymer. The resulting polymer was dried at 60° C. for 3 days under reduced pressure. Thirty grams of the resulting polymer was dissolved in 370 g of cyclohexane to obtain a polymer solution.

Reaction was carried out in the same manner as in Example 1 except that the polymer solution obtained above was used in place of the polymer solution obtained in Referential Example 1. At a point when thirty minutes elapsed after beginning of the reaction, it was observed that hydrogen absorption had been completed. The hydrogenation rate of the polymer was 97.4%. The hydrogenation rate was higher in Example 1.

Comparative Example 2

Cyclohexane was added to the polymer solution obtained in Referential Example 1 to adjust the polymer concentration to 10 wt. %. One hundred grams of this polymer solution and an adsorbent, prepared by impregnating 1.0 g of activated clay with 0.5 g of water, were added to a 200-ml flask, and the mixture was stirred at room temperature for 2 hours. This treated solution was centrifuged for 30 minutes at 1500 G to remove the adsorbent containing adsorbed metathesis polymerization catalyst. Thus, the polymer solution was obtained.

Reaction was carried out in the same manner as in Example 1 except that the polymer solution obtained above was used in place of the polymer solution obtained in Referential Example 1. At a point when thirty minutes elapsed after beginning of the reaction, it was observed that hydrogen absorption had been completed. The hydrogenation rate of the polymer was 70.4%. The hydrogenation rate was higher in Example 1 as compared with Example 1.

Comparative Example 3

Reaction was carried out in the same manner as in Example 1 except that the polymer solution obtained in Comparative Example 3 was used in place of the polymer solution obtained in Referential Example 1, 1.90 g of cobalt(III) acetylacetonate was used as the component (c), a solution of 4.20 g of triisobutylaluminum, the component (d), in 5.80 g of cyclohexane was used, and that the reaction temperature was 60° C. At a point when thirty minutes elapsed after beginning of the reaction, it was observed that hydrogen absorption had been completed. The hydrogenation rate of the polymer was 99.7%. The hydrogenation rate was higher in Example 3 as compared with Example 3.

Comparative Example 4

Reaction was carried out in the same manner as in Example 1 except that the polymer solution obtained in Comparative Example 1 was used in place of the polymer solution obtained in Referential Example 1, 0.14 g of nickel(II) acetylacetonate was used as the component (c), and that a solution of 0.42 g of triisobutylaluminum, the component (d), in 9.58 g of cyclohexane was used. At a point when thirty minutes elapsed after beginning of the reaction, it was observed that hydrogen absorption had been completed. The hydrogenation rate of the polymer was 99.7%. The hydrogenation rate was higher in Example 5 as compared with Comparative Example 4.

Comparative Example 5

Hydrogenation was repeated ten times in the same autoclave of Example 1 in the same manner as in Example 1. The inner surface of the autoclave was examined to find that minute corrosion was observed near the boundary between the parts of the inner surface with which the reaction solution contacted and did not contact.

Referential Example 7

Under a nitrogen atmosphere, 300 parts by weight of cyclohexane, 0.48 part by weight of 1-hexene and 0.30 part by weight of tetrabutyltin were added to 10 parts by weight of 6-methyl-1,4:5,8-dimethano-1,4,4a,5,6,7,8,8a-octahydronaphthalene. While keeping the resulting mixture at 40° C. with stirring, 90 parts by weight of 6-methyl-1,4:5,8-dimethano-1,4,4a,5,6,7,8,8a-octahydronaphthalene and 32.0 parts by weight of a 0.5 wt % cyclohexane solution of tungsten hexachloride were continuously added thereto over 60 minutes. Thereafter, reaction was carried out for 1 hour to obtain 424 parts by weight of a ring-opened polymer solution.

This ring-opened polymer solution was analyzed by gas chromatography, and it was found that the residual monomer was not detected, and that the conversion to the polymer was nearly 100%.

Referential Example 8

Under a nitrogen atmosphere, 250 parts by weight of cyclohexane, 0.59 part by weight of 1-hexene and 0.60 part by weight of tetraoctyltin were added to 7.0 parts by weight of dicyclopentadiene and 3.0 parts by weight of 6-methyl-1,4:5,8-dimethano-1,4,4a,5,6,7,8,8a-octahydronaphthalene. While keeping the resulting mixture at 40° C. with stirring, a mixture of 63 parts by weight of dicyclopentadiene and 27 parts by weight of 6-methyl-1,4:5,8-dimethano-1,4,4a,5,6, 7,8,8a-octahydronaphthalene and 39.0 parts by weight of a 0.5 wt. % cyclohexane solution of tungsten hexachloride were continuously added thereto over 60 minutes. Thereafter, reaction was carried out for 1 hour to obtain 382 parts by weight of a ring-opened polymer solution.

This ring-opened polymer solution was analyzed by gas chromatography, and it was found that either of the monomers, cyclopentadiene and 6-methyl-1,4:5,8-dimethano-1,4, 4a,5,6,7,8,8a-octahydronaphthalene, was not detected, and that the conversion to the polymer was nearly 100%.

Example 18

To 100 parts by weight of the ring-opened polymer solution obtained in Referential Example 7 were added 0.14 part by weight of butyl glycidyl ether and 0.63 g of a nickel-alumina catalyst (N163A produced by Nikki Kagaku Co.). The resulting mixture was added to a pressure-proof reactor made of SUS-316. Hydrogen was introduced into the reactor, and hydrogenation was carried out at 210° C. for 6 hours under a hydrogen pressure of 45 kg/cm². After finish of the reaction, the reaction solution was diluted with 65 parts by weight of cyclohexane, and catalyst residues were removed by filtration. Thus, 158 parts by weight of a solution containing the hydrogenated product of the ring-opened polymer.

Fifty parts by weight of this solution was poured into 150 parts by weight of isopropyl alcohol with stirring to coagulate the hydrogenated product of the ring-opened polymer. This coagulated product was recovered by filtration, washed with 100 parts by weight of isopropyl alcohol and dried at 120° C. for 40 hours under 1 Torr or less in a vacuum drier. Thus, 7.0 parts by weight of the hydrogenated product of the ring-opened polymer of 6-methyl-1,4:5,8-dimethano-1,4,4a, 5,6,7,8,8a-octahydronaphthalene.

This hydrogenated product had a number average molecular weight of 29,000 and a weight average molecular weight of 65,000 as values converted to polystyrene basis by gel.permeation.chromatography, a hydrogenation rate of 99.8% or more measured by $^1$H-NMR spectrum, and a glass transition temperature of 151° C. measured by differential scanning calorimetry.

Twenty-five grams of this hydrogenated product was burnt to ashes. The ashes were dissolved in sulfuric acid and analyzed by ICP analysis. As a result, it was found that the amount of the tungsten atom in the hydrogenated product was 25 ppb (detection limit) or less, that of the tin atom was 25 ppb (detection limit) or less and that of the nickel atom was 25 ppb (detection limit) or less.

The above hydrogenation was carried out four times in succession. After the fourth hydrogenation was finished, the inner surface of the pressure-proof reactor was examined, but abnormalities such as corrosion, etc. were not observed.

Example 19

To 100 parts by weight of the ring-opened polymer solution obtained in Referential Example 7 were added 0.14 part by weight of butyl glycidyl ether and 0.081 part by weight of isopropyl alcohol, and the resulting mixture was stirred at 50° C. for 4 hours to inactivate the polymerization catalyst. Thereafter, 0.50 part by weight of a nickel-alumina catalyst (N163A) was added to the mixture which was then added to the same pressure-proof reactor as used in Example 1. After introducing hydrogen into the reactor, hydrogenation was carried out at 210° C. for 6 hours under a hydrogen pressure of 45 kg/cm². After finish of the reaction, the reaction solution was diluted with 65 parts by weight of cyclohexane, and catalyst residues were removed by filtration. Thus, 159 parts by weight of a solution containing the hydrogenated product of the ring-opened polymer.

Fifty parts by weight of this solution was coagulated and dried in the same manner as in Example 1 to obtain 7.1 parts by weight of the hydrogenated product of the ring-opened polymer of 6-methyl-1,4:5,8-dimethano-1,4,4a,5,6,7,8,8a-octahydronaphthalene.

The same analyses as in Example 18 were carried out, and it was found that this hydrogenated product has a number average molecular weight of 29,000 and a weight average molecular weight of 65,000, a hydrogenation rate of 99.8% or more and a glass transition temperature of 151° C. Further, it was found that the amount of the tungsten atom in the hydrogenated product was 25 ppb (detection limit) or less, that of the tin atom was 25 ppb (detection limit) or less and that of the nickel atom was 25 ppb (detection limit) or less.

The above decomposition of the polymerization catalyst and hydrogenation were carried out four times in succession. After the fourth hydrogenation was finished, the inner surface of the pressure-proof reactor was examined, but abnormalities such as corrosion, etc. were not observed.

Example 20

To 100 parts by weight of the ring-opened polymer solution obtained in Referential Example 8 were added 0.19 part by weight of butyl glycidyl ether and 0.11 part by weight of isopropyl alcohol to inactivate the polymerization catalyst in the same manner as in Example 2. Thereafter, 0.57 part by weight of a nickel-alumina catalyst (N163A) was added as the hydrogenation catalyst to the mixture which was then added to the same pressure-proof reactor as used in Example 1. After introducing hydrogen into the reactor, hydrogenation was carried out at 210° C. for 6 hours under a hydrogen pressure of 45 kg/cm². After finish of the reaction, the reaction solution was diluted with 90 parts by weight of cyclohexane, and catalyst residues were removed by filtration. Thus, 180 parts by weight of a solution containing the hydrogenated product of the ring-opened polymer.

Fifty parts by weight of this solution was coagulated and dried in the same manner as in Example 1 to obtain 7.1 parts by weight of the hydrogenated product of the ring-opened polymer of 6-methyl-1,4:5,8-dimethano-1,4,4a,5,6,7,8,8a-octahydronaphthalene.

The same analyses as in Example 18 were carried out, and it was found that this hydrogenated product had a number average molecular weight of 27,000, a weight average molecular weight of 57,000, a hydrogenation rate of 99.8% or more and a glass transition temperature of 105° C. Further, it was found that the amount of the tungsten atom in the hydrogenated product was 25 ppb (detection limit) or less, that of the tin atom was 25 ppb (detection limit) or less and that of the nickel atom was 25 ppb (detection limit) or less.

The same decomposition of the polymerization catalyst and hydrogenation as described above were carried out four times in succession. After the fourth hydrogenation was finished, the inner surface of the pressure-proof reactor was examined, but abnormalities such as corrosion, etc. were not observed.

Example 21

Inactivation of the polymerization catalyst and hydrogenation were carried out in the same manner as in Example 19 except that 0.065 part by weight of propylene oxide was used in place of butyl glycidyl ether. Thus, 155 parts by weight of the solution containing the hydrogenated product of the ring-opened polymer was obtained.

Fifty parts by weight of this solution was coagulated and dried in the same manner as in Example 1 to obtain 6.9 parts by weight of the hydrogenated product of the ring-opened polymer of 6-methyl-1,4:5,8-dimethano-1,4,4a,5,6,7,8,8a-octahydronaphthalene.

The same analyses as in Example 18 were carried out, and it was found that this hydrogenated product had a number average molecular weight of 29,000, a weight average molecular weight of 65,000, a hydrogenation rate of 99.8% or more and a glass transition temperature of 151° C. Further, it was found that the amount of the tungsten atom in the hydrogenated product was 25 ppb (detection limit) or less, that of the tin atom was 25 ppb (detection limit) or less and that of the nickel atom was 25 ppb (detection limit) or less.

The same decomposition of the polymerization catalyst and hydrogenation as described above were carried out four times in succession. After the fourth hydrogenation was finished, the inner surface of the pressure-proof reactor was examined, but abnormalities such as corrosion, etc. were not observed.

Example 22

Inactivation of the polymerization catalyst and hydrogenation were carried out in the same manner as in Example 19 except that 0.30 part by weight of powdery zinc was used in place of butyl glycidyl ether. Thus, 158 parts by weight of the solution containing the hydrogenated product of the ring-opened polymer was obtained.

Fifty parts by weight of this solution was coagulated and dried in the same manner as in Example 1 to obtain 7.0 parts by weight of the hydrogenated product of the ring-opened polymer of 6-methyl-1,4:5,8-dimethano-1,4,4a,5,6,7,8,8a-octahydronaphthalene.

The same analyses as in Example 18 were carried out, and it was found that this hydrogenated product had a number average molecular weight of 29,000, a weight average molecular weight of 65,000, a hydrogenation rate of 99.8% or more and a glass transition temperature of 151° C. Further, it was found that the amount of the tungsten atom in the hydrogenated product was 25 ppb (detection limit) or less, that of the tin atom was 25 ppb (detection limit) or less, that of the nickel atom was 25 ppb (detection limit) or less and that of the zinc atom was 25 ppb (detection limit) or less.

The same decomposition of the polymerization catalyst and hydrogenation as described above were carried out four times in succession. After the fourth hydrogenation was finished, the inner surface of the pressure-proof reactor was examined, but abnormalities such as corrosion, etc. were not observed.

Comparative Example 6

Hydrogenation was carried out in the same manner as in Example 18 except that butyl glycidyl ether was not used, to obtain 154 parts by weight of a solution containing the hydrogenated product of the ring-opened polymer.

Fifty parts by weight of this solution was coagulated and dried in the same manner as in Example 1 to obtain 7.2 parts by weight of the hydrogenated product of the ring-opened polymer of 6-methyl-1,4:5,8-dimethano-1,4,4a,5,6,7,8,8a-octahydronaphthalene.

The same analyses as in Example 18 were carried out, and it was found that this hydrogenated product had a number average molecular weight of 29,000, a weight average molecular weight of 65,000 and a glass transition temperature of 151° C., but that its hydrogenation rate was 98.5%. Further, it was found that the amount of the tungsten atom in the hydrogenated product was 25 ppb (detection limit) or less, that of the tin atom was 25 ppb (detection limit) or less and that of the nickel atom was 25 ppb (detection limit) or less.

The same hydrogenation as described above was carried out four times in succession. After the fourth hydrogenation was finished, the inner surface of the pressure-proof reactor was examined. As a result, it was found that minute corrosion was observed at the upper part of the reactor and near the boundary between the lower and upper parts of the inner surface with which the hydrogenation solution contacted and did not contact, respectively.

According to the method of the present invention, before the beginning of hydrogenation of the polymer obtained from the monomer, there is no need to remove the metathesis polymerization catalyst used in the polymerization of the monomer. Because of this, the hydrogenation can be carried out with a good efficiency and besides in the absence of the inactivating agent for the metathesis polymerization catalyst disturbing the activity of the hydrogenation catalyst. Therefore, the hydrogenation is easy and provides the hydrogenated product of high hydrogenation rate.

Further, according to the method of the present invention, the inner surface of a hydrogenation reactor can be prevented from corrosion by a hydrogen halide, and besides steps for removing the polymerization catalyst and its residues can be omitted, so that this method is very advantageous for industrial production.

What is claimed is:

1. A method for preparing a hydrogenated metathesis polymer which comprises:

metathetically polymerizing a monomer in the presence of a metathesis catalyst comprising (a) a catalyst component of a transition metal compound and (b) a co-catalyst component of a metal compound, and, without inactivating the metathesis catalyst, hydrogenating the thus formed metathesis polymer in the presence of a hydrogenation catalyst comprising (c) a transition metal compound and (d) a reductive metal compound.

2. A method for preparing a hydrogenated metathesis polymer which comprises:

metathetically polymerizing a monomer in a reaction system containing a metathesis catalyst comprising (a) a catalyst component of a transition metal compound and (b) a co-catalyst component of a metal compound, and, without inactivating the metathesis catalyst, hydrogenating the thus formed metathesis polymer in the presence of a hydrogenation catalyst comprising (c) a transition metal compound and (d) a reductive metal compound, adding an acid-binding compound to the reaction system, and recovering the hydrogenated metathesis polymer from the reaction system.

3. A method according to claim 1, wherein the transition metal compound (c) is the organometal compound, halide, alkoxide, acetylacetonate, sulfonate or naphthenate of V, ti, Mn, Fe, Co or Ni.

4. A method according to claim 3, wherein the transition metal compound (c) is the organometal compound, alkoxide or acetylacetonate of Ti, Fe, Co or Ni.

5. A method according to claim 1, wherein the reductive metal compound (d) is the organometal compound or hydride of Al, Li, Zn or Mg.

6. A method according to claim 5, wherein the reductive metal compound (d) is alkylaluminum or alkyllithium.

7. A method according to claim 1, wherein the catalyst component of a transition metal compound (a) is the halide, oxyhalide or alkoxyhalide of W, Mo, ti or V.

8. A method according to claim 7, wherein the co-catalyst component of a metal compound (b) is the organic compound of Al, Sn, Li, Na, Mg, Zn, Cd or B.

9. A method according to claim 1, wherein the monomer is a monocyclic cycloolefin, polycyclic cycloolefin, acetylenes or dienes having double bonds at the both ends.

10. A method according to claim 1, wherein metathesis polymerization of the monomer is carried out in an inert organic solvent.

11. A method according to claim 10, wherein the inert organic solvent is an aromatic hydrocarbon, alicyclic hydrocarbon, halogenated hydrocarbon and/or an ether.

12. A method according to claim 10, wherein the amount of the inert organic solvent is 1 to 100 times by weight that of the monomer.

13. A method according to claim 1, wherein the amount of the catalyst component of a transition metal compound (a) is 0.000001 to 1 time by mole that of the monomer.

14. A method according to claim 1, wherein the amount of the co-catalyst component of a metal compound (b) is 1 to 100 times that of the catalyst component of a transition metal compound (a) in terms of the molar ratio of the metal atoms contained in the components (b) and (a).

15. A method according to claim 1, wherein the amount of the transition metal compound (c) is 0.001 to 1000 mmoles based on 100 g of the metathesis polymer.

16. A method according to claim 1, wherein the amount of the reductive metal compound (d) is 0.5 to 50 times that of the transition metal compound (c) in terms of the molar ratio of the metal atoms contained in the compounds (d) and (c).

17. A method according to claim 1, wherein the hydrogenation rate of the unsaturated bond contained in the main chain structure of the metathesis polymer is 50% or more.

18. A method according to claim 2, wherein the acid-binding compound is an epoxy compound.

19. A method according to claim 18, wherein the acid-binding compound is ethylene oxide, propylene oxide, butylene oxide, cyclohexene oxide, styrene oxide, methyl glycidyl ether, ethyl glycidyl ether, butyl glycidyl ether, phenyl glycidyl ether, ethylene glycol diglycidyl ether or an epoxy resin.

* * * * *